US009400830B2

(12) United States Patent
Dipper et al.

(10) Patent No.: US 9,400,830 B2
(45) Date of Patent: Jul. 26, 2016

(54) KEY FIGURE DATA FILTERS IN OLAP WITH HIERARCHIES

(71) Applicants: Stefan Dipper, Wiesloch (DE); Sebastian Schroetel, Heidelberg (DE); Stefan Unnebrink, Neckargemuend (DE); Michael Wilking, Zuzenhausen (DE)

(72) Inventors: Stefan Dipper, Wiesloch (DE); Sebastian Schroetel, Heidelberg (DE); Stefan Unnebrink, Neckargemuend (DE); Michael Wilking, Zuzenhausen (DE)

(73) Assignee: SAP SE, Walldorf (DE)

( * ) Notice: Subject to any disclaimer, the term of this patent is extended or adjusted under 35 U.S.C. 154(b) by 227 days.

(21) Appl. No.: 13/848,672

(22) Filed: Mar. 21, 2013

(65) Prior Publication Data

US 2014/0289183 A1 Sep. 25, 2014

(51) Int. Cl.
G06F 7/00 (2006.01)
G06F 17/00 (2006.01)
G06F 17/30 (2006.01)

(52) U.S. Cl.
CPC .................. *G06F 17/30592* (2013.01)

(58) Field of Classification Search
CPC ............... G06F 17/30286; G06F 17/30563; G06F 17/30592
USPC .......... 702/600, 602, 805; 707/600, 602, 805, 707/607
See application file for complete search history.

(56) References Cited

U.S. PATENT DOCUMENTS 7,698,264 B2 * 4/2010 Leikucs et al. ......... 707/999.003
2008/0140682 A1 * 6/2008 Grosset et al. ............. 707/100

* cited by examiner

*Primary Examiner* — Md. I Uddin
(74) *Attorney, Agent, or Firm* — Mintz Levin Cohn Ferris Glovsky and Popeo, P.C.

(57) ABSTRACT

A system and method of key figure data filters are presented. The key figure data filters are implemented in an analytical engine of a business warehouse system. The key figure data filters employ conditions, which can be expressed as a kind of selection that describe a set. A key figure data algorithm can be implemented by the analytical engine using the conditions, yet still respect hierarchies in the business warehouse database.

17 Claims, 9 Drawing Sheets

Axes, Characteristic Value Tuples

| Produkt ID | Geschäftsjahr Absatzmarkt | Kalenderjahr, 4 Sonderperiode 2004 Umsatz | Transaktionszähler | Anfragezahl |
|---|---|---|---|---|
| ANTILOP Hochstuhl, B | Deutschland | 283,62 EUR | 5 | 18 |
| | Spanien | 89,49 EUR | 1 | 2 |
| | Frankreich | 248,29 EUR | 3 | 9 |
| | Ergebnis | 621,40 EUR | 9 | 29 |
| BAMBU Rollo | Deutschland | 194,71 EUR | 2 | 5 |
| | Spanien | 96,26 EUR | 1 | 4 |
| | Frankreich | 166,77 EUR | 2 | 7 |
| | Ergebnis | 457,74 EUR | 5 | 16 |
| ARVET Mediahalter | Deutschland | 52,01 EUR | 1 | 3 |
| | Spanien | 231,88 EUR | 5 | 13 |
| | Frankreich | 164,82 EUR | 3 | 8 |
| | Ergebnis | 448,71 EUR | 9 | 24 |
| ANJA RAND Duschvorha | Deutschland | 154,45 EUR | 2 | 5 |
| | Spanien | 290,03 EUR | 4 | 12 |
| | Ergebnis | 444,48 EUR | 6 | 17 |
| AMORF RASTER Bettwae | Deutschland | 74,83 EUR | 2 | 6 |
| | Spanien | 118,05 EUR | 2 | 6 |
| | Frankreich | 246,69 EUR | 3 | 9 |
| | Ergebnis | 439,57 EUR | 7 | 21 |
| Gesamtergebnis | | 19.114,88 EUR | 343 | 998 |

Keyfigure Structure

Subtotal

Grand Total

Datacells, DAT_N

FIG. 1 (PRIOR ART)

| Customer | Revenue | Profit |
|---|---|---|
| Hans | 1900 | 200 |
| Hugo | 1500 | 100 |
| Condition Total | 3400 | 300 |
| Condition Others Total | 1600 | 700 |
| Grand Total | 5000 | 1000 |

FIG. 2

| PRED | SUCC |
|---|---|
| A | A |
| A | B |
| A | C |
| B | B |
| C | C |

(A)

| Country | Customer | Revenue | Profit |
|---|---|---|---|
| Germany | Hans | 1900 | 200 |
| Germany | Hugo | 1500 | 100 |
| Germany | Peter | 1000 | 150 |
| Germany | Andi | 600 | 100 |
| Austria | Hans | 900 | 200 |
| Austria | Hugo | 700 | 100 |
| Austria | Otto | 600 | 50 |
| Austria | Andi | 400 | 80 |
| Austria | Klaus | 400 | 100 |

(B)

| Customer | Revenue | Profit |
|---|---|---|
| Hans | 1900 | 200 |
| Hugo | 1500 | 100 |
| Condition Total | 3400 | 300 |
| Grand Total | 5000 | 1000 |

(C)

| Customer | Revenue |
|---|---|
| Hans | 1900 |
| Condition Total (C1+C2) | 1900 |
| Condition Total (C1) | 3400 |
| Condition Total (C2) | 1900 |
| Grand Total | 5000 |

| Country | Customer | Revenue |
|---|---|---|
| Germany | Hans | 1000 |
| | Hugo | 800 |
| | Condition Total | 1800 |
| | Total | 5000 |
| Austria | Hans | 900 |
| | Hugo | 700 |
| | Condition Total | 1600 |
| | Total | 3000 |
| Condition Total | | 3400 |
| Grand Total | | 8000 |

(E)

| Country | Customer | Revenue |
|---|---|---|
| Germany | Hans | 1000 |
| | Hugo | 800 |
| | Condition Total | 1800 |
| | Total | 5000 |
| Condition Total (C1+C2) | | 1800 |

(F)

| Customer | Revenue |
|---|---|
| Grand Total | 8000 |
| v Germany | 5000 |
| • Hans | 1000 |
| v Austria | 3000 |
| • Hans | 900 |

FIG. 7 (CONT.)

| Filters in SAP BW | Characteristic | Key figure |
|---|---|---|
| Data Filter | Selections/Slicer | ? |
| Visual Filter | Display Selections | Conditions |

FIG. 8

KEY FIGURE DATA FILTERS IN OLAP WITH HIERARCHIES

TECHNICAL FIELD

The subject matter described herein relates to online analytical processing (OLAP), and more particularly to key figure data filters in OLAP with hierarchies.

BACKGROUND

In Online Analytical Processing (OLAP) systems, huge amounts of data can be evaluated with basically three operations: consolidation, drill-down, roll-up and "slicing and dicing." Consolidation means that aggregates from the data to be evaluated are computed in one or more dimensions. The drill-down is a technique that allows users to navigate through the details. It describes the dimensions the data is evaluated in by the user. The last operation is the slice and dice operation. This describes a feature where users can take out (slicing) a specific set of data of the cube and view (dicing) the slices from a different viewpoint.

In one particular OLAP implementation, inside the SAP Business Warehouse (BW) product, the slice and dice operation is a standard operation. Here, the slicing is expressed via processes known as selections. Taking a closer look there are different types of selections happening in SAP BW.

The basic selection can be represented in standard relational algebra. A selection defines a comparator between a characteristic, also called a dimension or attribute, and a constant value (i.e., a characteristic value). All result tuples must apply to this comparator, e.g. "Business Partner='Bill'. This selection affects the aggregates, and the aggregated values consist only of key figure values of tuples that apply to the filters. These key figure values are also known as measures. This basic selection is also called a data filter, as it filters the data on database layer before any aggregations happen.

Besides the data filters, so-called visual filters exist. Visual filters are defined similarly to a characteristic data filter. A selection such as "Business Partner='Bill' as part of a visual filter would result in a result set that also only contains tuples where the business partner is "Bill". The difference lies in the aggregation behavior. As a data filter is executed on the data base layer, it affects the totals. A visual filter is executed after any aggregations, and therefore it just omits tuples in the display of the result set. Aggregates are created without considering the visual filter.

In some OLAP systems such as SAP's BW there are is a third type of filter. This type of filter is different from the other two in that the comparator is not defined between a characteristic and a constant, but rather is defined between a key figure and a constant value. So the comparator in this third type of filter could be represented such as "Revenue>'10.000'. This feature is called a "condition" in SAP BW. A condition is always defined with respect to one or more dimensions. Conditions act like a visual filter. So they do not affect totals that are more coarse than the level at which the condition is defined.

Putting these filters into a matrix of data filters and visual filters against characteristic filters and key figure filters the table in FIG. 8 is drawn. What is missing is a key figure data filter, which is needed to complete the provided feature set of an analytical engine some OLAP systems, such as SAP BW.

To understand how any selection can influence the OLAP result set, it must first be clear how the OLAP result set looks. Basically, the OLAP result set is form of a pivot table, such as is known from some spreadsheet programs, e.g. from Microsoft Excel. The table consists of two axes: a row axis and a column axis. These axes consist of characteristic value tuples, which are combinations out of the dimension tables of the star schema. In some OLAP analytical engines, tuple elements are the elements of the key figure structure. However, they are added after the analytical engine in the stack and are only relevant for display purposes. Structures shall not be handled any further in this document.

Between the axes, the data cells are displayed. The data cells are key figure values, and they contain the final OLAP aggregation result, as shown in FIG. 1. The basic problem of a condition data filter is that the key figure value upon which the filter is to be applied is determined via the aggregation process in the analytical engine. But to determine the condition total, the filter needs to be applied before the aggregation. Also normally the data filter (the slicer) is applied at the database level. The database cannot handle the key figure data filters. Accordingly, what is needed is a way to transform a filter defined by an OLAP condition into a characteristic data filter.

SUMMARY

This patent application shall describe a way to realize key figure data filters in SAP BW with respect to all current analysis features provided.

In one aspect, a method is disclosed, as executed by one or more processors. The method includes the steps of executing a main query on data without any tuple filters, and caching result data of the main query in a first data structure as intermediate data. The method further includes the step of generating one or more key figure data filters based on one or more conditions of the main query.

If the one or more conditions of the main query are on a hierarchical characteristic, the method includes post-filtering the intermediate data to generate a second data structure instance containing key figure data filter filtered data. However, if the one or more conditions of the main query are not on a hierarchical characteristic, the method includes executing a prequery to generate a multidimensional tuple filter, and executing the main query using the multidimensional tuple filter to generate a third data structure instance containing key figure data filter filtered data. In some aspects, a method further comprises filling a fourth data structure with key figure data filter filtered data from either the second data structure or the third data structure Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings, FIG. 1 shows key figure values as data cells, contain a final OLAP aggregation result;

FIG. 2 shows other key figure values as data cells in a table;

FIGS. 7A-7F illustrate result sets of various implementations of the methods described herein;

FIG. 8 shows filters that have been put into a matrix of data filters and visual filters against characteristic filters and key figure filters.

When practical, similar reference numbers denote similar structures, features, or elements.

DETAILED DESCRIPTION

Figure 3:
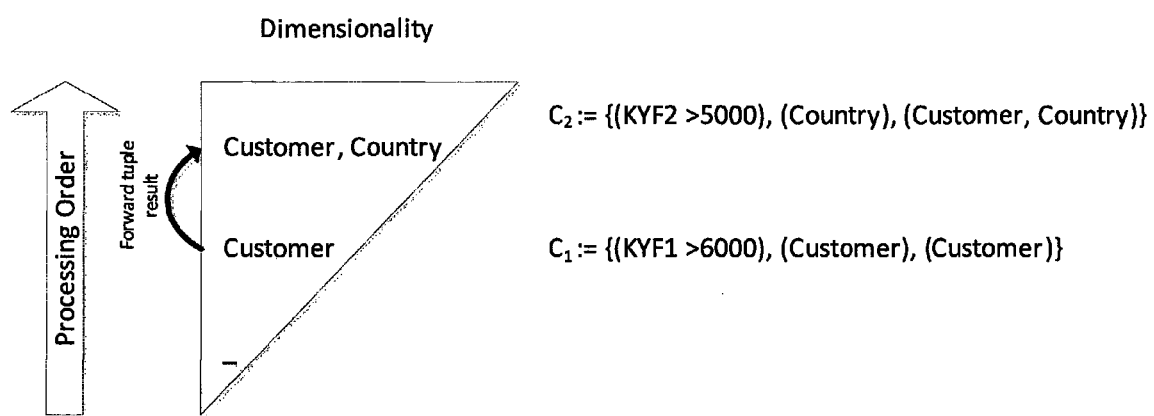
FIG. 3 illustrates prequery processing of conditions of one axis of a table.

To address these and potentially other issues with currently available solutions, methods, systems, articles of manufacture, and the like consistent with one or more implementations of the current subject matter can, among other possible advantages, provide key figure data filters that are theoretically consistent on one hand, yet implementable in an analytical engine of an OLAP system. In one example, this solution can be implemented in SAP's HANA database environment that powers SAP's BW system.

In particular, a condition can be expressed as a set, and can therefore act as a real data filter as it describes a clear data set. The conditions are the way to express both key figure visual filters as also key figure data filters. Where the user requests either a condition result row or a normal result row, the effect of a condition (data or visual filter) is distinguished. A condition on a non-hierarchical characteristic can be implemented with prequeries and multi-dimensional tuple filters. Further, a condition on a hierarchical characteristic can be implemented via a new post filter algorithm. The prerequisite for this is that a paradigm in some OLAP systems, such as the SAP BW system, that a hierarchy node is to be handled as a detail row (like a normal characteristic member) is not changed.

Algorithms in the form of computer-implemented methods are provided, and which can both be implemented running on a normal database, with the calculation happening in the server or in the database using database calculation features. The algorithms can be used to implement the condition result row feature, which in turn is specified from an end-user point of view as described below.

A basic requirement of the system and method described herein points towards the so called condition result-row. So far the common known result row ("Sub-Total" or "Grand Total") is not affected by conditions, as they are only a visual filter. Two additional result rows are needed that should be displayed together with, or instead of, the common result row. Accordingly, there could be any combination of the three result rows possible. So all, only two of them, or only one of them, are displayed. These two additional result rows are the "Condition Total", i.e., the aggregate of all tuples that apply to the key figure data filter expressed by the condition, and the "Condition Others Total", i.e., the aggregate of all tuples that are filtered out by the key figure data filter. These require key figure data filters in the analytical engine.

In some implementations, transforming a filter defined by an OLAP condition into a characteristic data filter includes execution of so-called prequeries. These are internal queries that are executed inside the analytical engine to pre-fetch some data for any later purposes. So the idea is to execute a prequery with the known key figure visual filter implementation (the OLAP Conditions) and get the resulting characteristic value tuples. The tuples shall be then used in the main query as characteristic data filter. As a query returns data in characteristic value tuples the analytical engine must be enabled to process multi-dimensional tuple filters.

The main query is then executed with respect to the tuple filter and the data is aggregated according to the needed subtotal levels in order to get the details and the condition totals. For the "Condition Others Totals," the tuple filter for the main query needs to be negated. The result of the main query is the OLAP result set.

Prequery Processing

Prequeries are used for transforming a condition visual filter into a characteristic data filter. So far prequeries are used mainly in the variable processing, to replace variable values by a query result. FIG. 2 illustrates the prequery processing of conditions of one axis. In the example shown in FIG. 2, two conditions exist, one with key FIG. 1 on characteristic "Customer," and one with key FIG. 2 on characteristic "Country." As the order of the characteristics in the drill-down is customer-country, the dimensionality, i.e., defined by the order of the characteristics in the drill-down, of condition 2 is also customer-country.

For every axis (row axis and column axis) the prequery processing is executed independent from each other. For every subtotal level, a condition defined on one prequery is executed. The processing order of these prequeries is from the coarse subtotal levels to the fine ones. As a performance optimization, the tuples from a prior prequery can be used as a starting point for a next prequery in the processing order. The tuples are used as multi-dimensional tuple filters for the next query in line. The last prequery on one axis then returns the characteristic value tuples for the main query.

Conditions, Hierarchies and Condition Result Rows

A hierarchy node is preferably a normal detail cell. Thus, a condition also affects hierarchy nodes, and it does not only filter leafs. Additionally, nodes are not deleted if they have any children that are not to be deleted according to the condition. Another difference from conditions on normal flat characteristics is that on hierarchical characteristics, only comparison operators (= < > ≤ ≥ ≠) can be used.

A normal hierarchy, also called an external hierarchy, is a modeled entity that provides a hierarchical view of a certain characteristic. Normal hierarchies can be time-dependent, and can have several versions, among other qualities. By contrast, a universal display hierarchy is not a modeled entity. A universal display hierarchy is simply a display setting that allows a result set to be rendered in a hierarchical way. For a universal display hierarchy, when having a look on the hierarchy levels in comparison to the universal display hierarchy, conditions can be applied on several levels (illustrated as characteristics on the axis). Each condition on the level is actually linked by AND. A tuple only remains if it applies to all conditions. In case of a normal hierarchy, when defining all levels independent from each other, the conditions applied to the levels behave like the levels are connected by OR. Accordingly, there is a difference in the behavior between universal display hierarchy and an external hierarchy. One basic difference is that a hierarchy node of an external hierarchy is considered as a detail row.

Hierarchies need to be handled differently depending on how a hierarchy node will be treated. In accordance with preferred implementations, a hierarchy node is a normal detail row. As the hierarchy filtering always describes sub trees, putting the result tuples of the prequery only in the normal filter is insufficient. For this a so-called "ON filter" (this is the list of visible hierarchy nodes in the query) can be used. This is a sort of visual filter that contains the visible hierarchy nodes and leafs. So for the processing in the main query, the tuples from the prequery shall result in filter entries and ON entries. The filter entries select a subset of the total hierarchy tree, and the ON filter makes sub trees smaller. FIG. 3 illustrates the difference between filter (slicer) and ON-filter.

As shown in FIG. 3, the current ON filter is also insufficient, as it does not take account to the dimensionality. If there are other characteristics before the one with the hierarchy, the several tuple groups would not be considered (in every tuple, the same hierarchy nodes would be displayed). Accordingly, an n-dimensional bucket-based post filter is used that runs after the hierarchy aggregation.

Further, the several axes need to be considered. The prequery must deliver the following Tuples: T:={(Leafs in SP∈C) ∪(Visible Nodes)}. Thus, all parents up to the root node must be returned as tuples. Also the parents that would be deleted by the condition but stay because some children stay.

Conditions on a hierarchical characteristic cannot be processed with the prequery solution, as this would lead to a situation in which conditions only apply to leafs (i.e., only leafs are selected from the database, the hierarchy structure is built later). Consequently, there are two areas where conditions shall be evaluated:

1. Conditions on non-hierarchical characteristics are executed in the prequery. In a specific implementation for SAP HANA, this can occur in the OLAP Layer Model.

2. Conditions on hierarchical characteristics are executed in the main query.

Currently the condition processing is implemented in the data retrieval area (the so-called "Data Get"), but if moved to another area, an optimized algorithm can be used that runs during the hierarchy aggregation.

Figure 4:
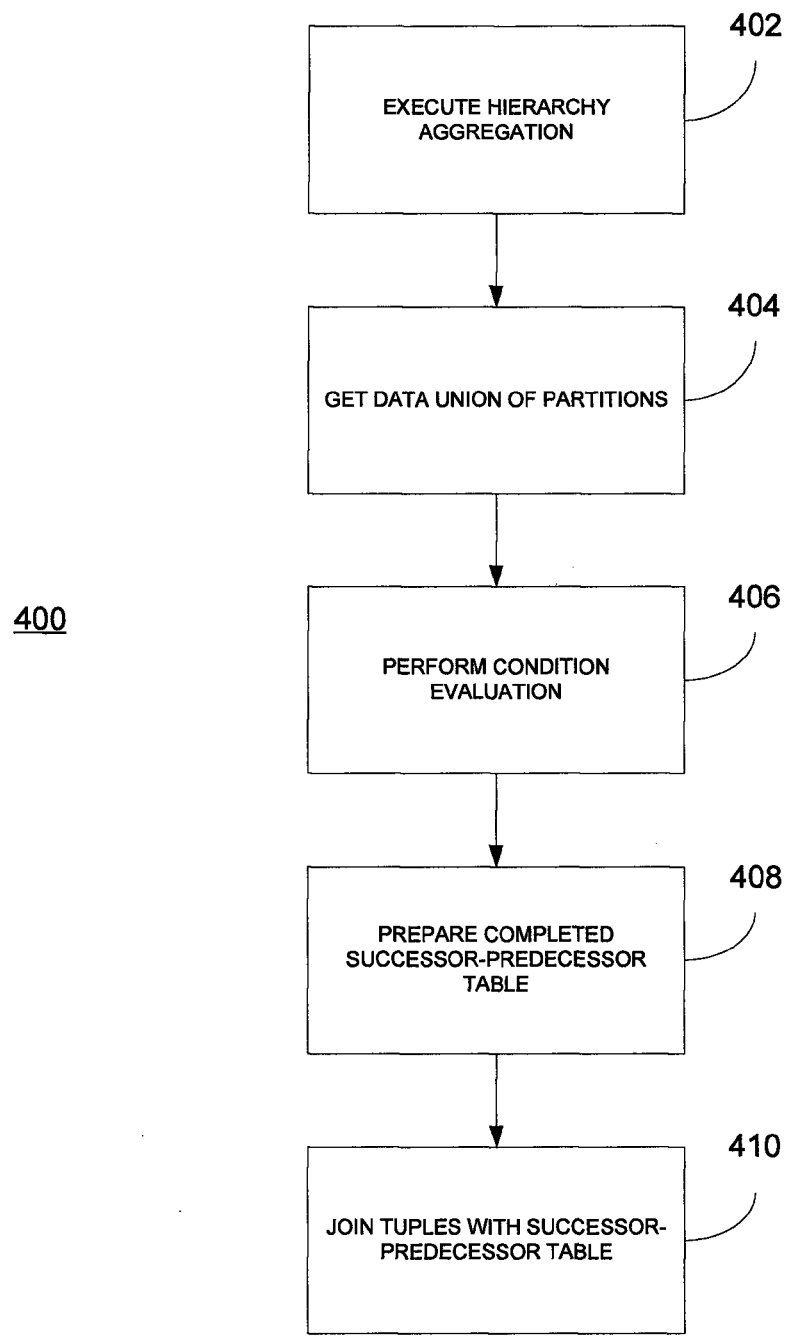
FIG. 4 is a flowchart of a condition post filter method for hierarchical characteristics.

FIG. 4 is a flowchart of a condition post filter method 400 for hierarchical characteristics. At 402, hierarchy aggregation is executed. The analytical engine determines the data for the result set with several read requests to the data base. The result of a single read request is stored in a partition, which is a data object for subsets of the data to be processed. After all read requests are processed, the data needs to be merged (depending on the query of course). This is done with a union operation in the analytical engine. At 404, the data union of the partitions is obtained. At 406, the condition evaluation is performed: first, the tuples are reviewed and checked whether they should be filtered out by the condition. If yes, tuple is marked as "ok after condition filter". After this, all tuples that apply to the condition are marked.

Figure 5:
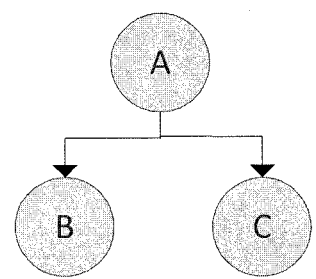
FIG. 5 shows a completed successor-predecessor table of the hierarchy.

At 408, a completed successor-predecessor table of the hierarchy is prepared. For every hierarchy node/leaf, the table will contain all predecessors (not only the direct ones), and will contain an identity, means successor=node and predecessor=node. A simple example is shown in FIG. 5. Returning to FIG. 4, at 410, the tuples with the "ok"-marker are joined (i.e., using an inner join) with the successor-predecessor table. The result is a set of tuples that contains all nodes/leafs that apply to the condition, and all their parents (that should be also part of the result, irrespective to the condition filter).

Figure 6:
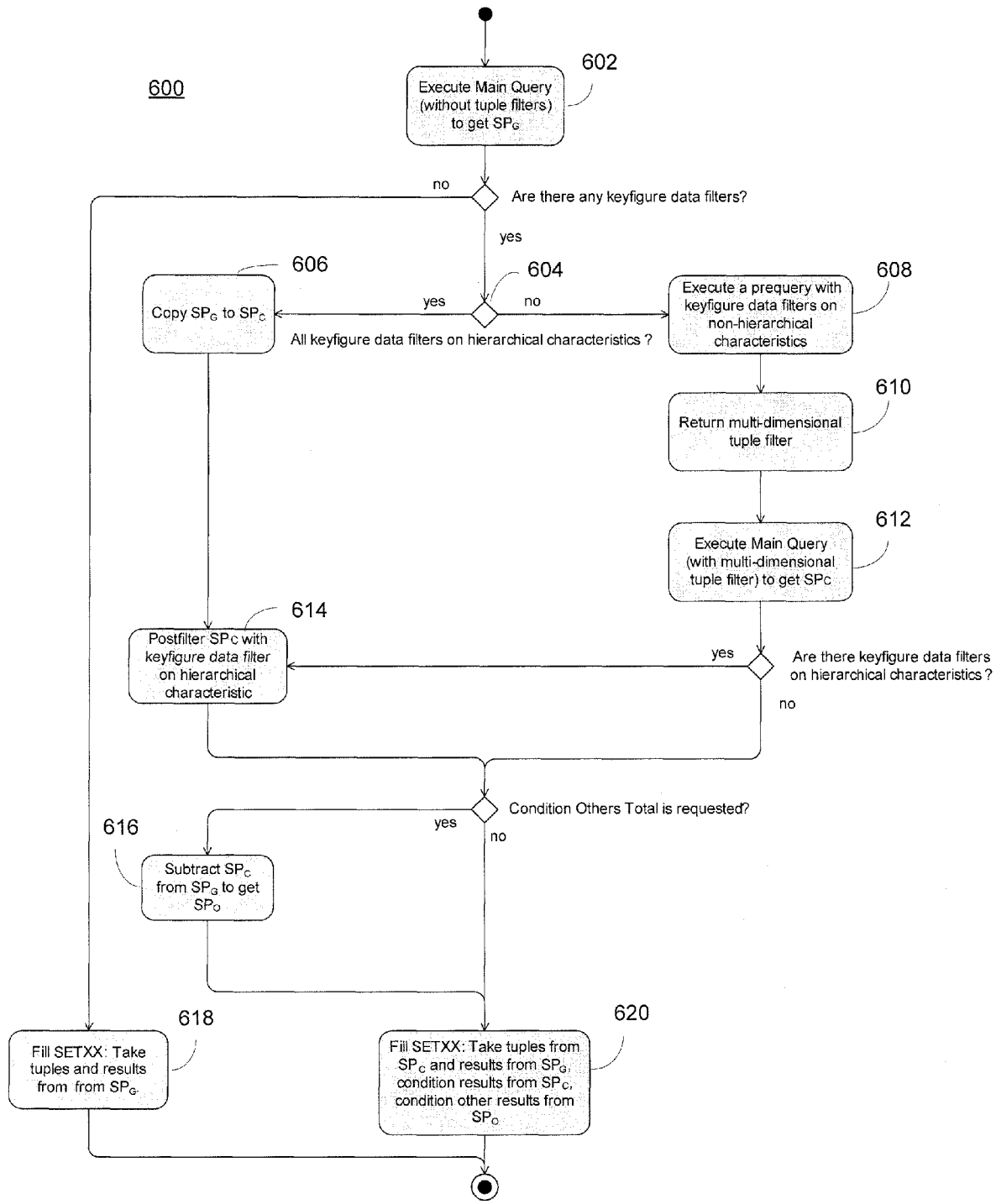
FIG. 6 is a flowchart of a OLAP system query method.

FIG. 6 is a flowchart of a OLAP system query method 600. At 602, the main query is executed without any tuple filters from condition filters. The data is temporarily cached in a data structure referred to as "SP" and which stores intermediate data inside the analytical engine. As this instance of the SP stores the data for the grand total, it is labeled $SP_G$. If the drill-down contains any hierarchical characteristic, the hierarchy aggregation is executed upon the $SP_G$.

Next, at 604 it is determined whether or not all key figure data filters in the query are on a hierarchical characteristic. If yes, at 606 the $SP_G$ can be post filtered and the result is then considered as a new SP instance, the $SP_C$. This instance contains the key figure data filter filtered data for the analytical engine. If, on the other hand, key figure data filters are on non-hierarchical characteristics, the prequery processing described above is run. Thus, for each non-hierarchical characteristics with key figure data filters a prequery is executed (608) and a multidimensional tuple filter is built (610). With this tuple filter the main query is executed, at 612. The main query with the filter returns the $SP_C$. If it is the "mixed-case", that key figure data filters exist both on non-hierarchical and hierarchical characteristics, the hierarchy post-filter is executed at 614. If the Condition Others result row is needed, at 616 a third SP instance is built, in which the $SP_C$ is subtracted from the $SP_G$ to generate an $SP_O$. This is done via the set operation "minus".

At 618 (if there are no conditions) or at 620, a data structure is filled. The data structure contains the tuples of the multidimensional result set of the OLAP analytical engine, and is the data structure by which the analytical engine communicates with consumers. Filling the result set tuples is based on the tuples taken from the $SP_C$. The $SP_C$ always contains the correct subset of tuples, the $SP_G$ contains more tuples. The key figure values are read-dependent on what should be displayed. Condition Total values are taken from the $SP_C$, Condition Others Total values are taken from the $SP_O$, and Grand Total Values are taken from $SP_G$.

As previously mentioned, customer requirements point towards the so called condition result-row. That means it needs to be possible that a condition that is a display filter can also act as a data filter. Thus the key figure data filters are implemented to realize Condition result rows. This section shall first show the implementation from an end-user point of view by explaining some sample drill down cases.

The data basis for the following examples is shown FIG. 7A. FIG. 7B illustrates a simple drill-down. To simplify the examples only one of the two condition totals is requested, the Total of the Condition filtered values. FIG. 7B shows a result set with Condition "Top 2 Customer on Revenue" and a global filter on Country="Germany", illustrating a simple Top 2 Condition on {Revenue; Customer}. A condition result for "Profit"–300 is also determined, even if this key figure is not involved in any condition. The condition result shall also be determined on key figures that are not affected by a condition. The current drill-down requests this total in this case.

FIG. 7C illustrates a simple drill-down with two conditions: a result set with condition 1 "Top 2 Customer on Revenue" and condition 2 "Revenue of Customer>1500" and a global filter on Country="Germany". If there are two conditions, then potentially three condition result rows exist. Generally, 2n–1 result rows exist, where n is the number of concurrent conditions. There should be no several condition result rows. The condition result row that is displayed should fit to the current display and explain the detail cells. That means it is the result row for the condition combination. The condition total (C1+C2) is dependent on the order of the characteristics with conditions on the axes, and a different order may result in different condition results. If a condition is defined on a characteristic and not in the drill-down, then it should not be applied.

FIG. 7D illustrates a drill-down with two characteristics and only one condition, i.e. a Condition 1 "Top 2 Customer on Revenue". Even if "Country" is not involved in any condition, there is a condition result row. To allow special analysis use cases, this is necessary (i.s. an analysis to "Show the Revenue that all Top2 Customers of each country generate overall"). If a condition is defined on an inner characteristic on the axis, all outer characteristics shall have a condition result row as well. Logically more inner characteristics shall not have any condition result rows. As extension to the fact that the condition total is dependent on the order of the characteristics in the drill-down, the most upper condition total may change if the drill-down is changed, so it behaves differently than the Grand Total. Also important is the case if the characteristic "Customer" is moved to the free characteristics list. In this case no condition would be applied. The condition result is only displayed if there is any applicable and active condition on the drill-down characteristics. Conditions on characteristics on the free axis cannot be considered. If there is no condition on the axis, no condition result is displayed.

FIG. 7E illustrates a result set of a drill down with two characteristics and two conditions: i.e., condition 1 "Top 2 Customer on Revenue" and condition 2 "Top 1 Country on Revenue". Here also several condition result rows can be defined. Overall as a rule, there should only be one condition result row that fits to the displayed detail cells. Finally, FIG. 7F illustrates a result set of a drill-down with one characteristic with a hierarchy and one condition, i.e., condition 1 "Revenue of Customer>=900". A hierarchy node is something between a result row and a detail cell. For conditions, if sub nodes are filtered and condition results rows are requested, there should not be any extra nodes that contain the condition results. As every hierarchy node is an independent characteristic member, there is only one condition total for the whole hierarchy. In case of hierarchies, the nodes and leafs shall be treated as normal characteristic member/detail rows. In case of a result row if the hierarchy has several root nodes, the condition result row shall be displayed.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT), a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
executing, by one or more processors, a main query on data without any tuple filters;
caching, by one or more processors, result data of the main query in a first data structure as intermediate data;
generating, by one or more processors, one or more key figure data filters based on one or more conditions of the main query, at least one condition of the one or more conditions comprising a relative comparison between a key figure and a constant value;
if the one or more conditions of the main query are on a hierarchical characteristic, post-filtering, by one or more processors, the intermediate data to generate a second data structure instance containing key figure data filter filtered data; and
if the one or more conditions of the main query are not on a hierarchical characteristic:
executing, by one or more processors, a prequery to generate a multidimensional tuple filter; and
executing, by one or more processors, the main query using the multidimensional tuple filter to generate a third data structure instance containing key figure data filter filtered data, the third data structure instance being generated by subtracting the second data structure instance from the first data structure.

2. The method in accordance with claim 1, further comprising filling, by one or more processors, a fourth data structure with key figure data filter filtered data from either the second data structure or the third data structure.

3. The method in accordance with claim 2, wherein the fourth data structure contains tuples of the multidimensional result set of an analytical engine of an online analytical processing system.

4. The method in accordance with claim 1, further comprising aggregating the data based on the main query.

5. The method in accordance with claim 1, further comprising, if the one or more conditions are on non-hierarchical characteristics, running a prequery processing to build a multidimensional tuple filter.

6. The method of claim 1, wherein:
the at least one condition operates as a visual filter;
the at least one condition affects a plurality of hierarchy nodes of the data and a plurality of filter leafs of the data; and
a hierarch node of the plurality of hierarchy nodes is not deleted when one or more children nodes of the hierarchy node are not to be deleted by the at least one condition.

7. The method of claim 1, wherein:
the key figure characterizes an operational attribute that is numerically measured;
the key figure being one of revenue and profit.

8. A computer program product comprising a non-transitory machine-readable medium storing instructions that, when executed by at least one programmable processor, cause the at least one programmable processor to perform operations comprising:

execute a main query on data without any tuple filters;
cache result data of the main query in a first data structure as intermediate data;
generate one or more key figure data filters based on one or more conditions of the main query, at least one condition of the one or more conditions comprising a relative comparison between a key figure and a constant value;
if the one or more conditions of the main query are on a hierarchical characteristic, post-filter the intermediate data to generate a second data structure instance containing key figure data filter filtered data; and
if the one or more conditions of the main query are not on a hierarchical characteristic:
execute a prequery to generate a multidimensional tuple filter; and
execute the main query using the multidimensional tuple filter to generate a third data structure instance containing key figure data filter filtered data, the third data structure instance being generated by subtracting the second data structure instance from the first data structure.

9. The computer program product in accordance with claim 8, further comprising filling, by one or more processors, a fourth data structure with key figure data filter filtered data from either the second data structure or the third data structure.

10. The computer program product in accordance with claim 9, wherein the fourth data structure contains tuples of the multidimensional result set of an analytical engine of an online analytical processing system.

11. The computer program product in accordance with claim 8, wherein the operations further comprise aggregating the data based on the main query.

12. The computer program product in accordance with claim 8, wherein the operations further comprise, if the one or more conditions are on non-hierarchical characteristics, running a prequery processing to build a multidimensional tuple filter.

13. A system comprising:
at least one programmable processor; and
a machine-readable medium storing instructions that, when executed by the at least one processor, cause the at least one programmable processor to perform operations comprising:
executing a main query on data without any tuple filters;
caching result data of the main query in a first data structure as intermediate data;
generating one or more key figure data filters based on one or more conditions of the main query, at least one condition of the one or more conditions comprising a relative comparison between a key figure and a constant value;
if the one or more conditions of the main query are on a hierarchical characteristic, post-filtering the intermediate data to generate a second data structure instance containing key figure data filter filtered data; and
if the one or more conditions of the main query are not on a hierarchical characteristic:
executing a prequery to generate a multidimensional tuple filter; and
executing the main query using the multidimensional tuple filter to generate a third data structure instance containing key figure data filter filtered data, the third data structure instance being generated by subtracting the second data structure instance from the first data structure.

14. The method in accordance with claim 13, further comprising filling, by one or more processors, a fourth data structure with key figure data filter filtered data from either the second data structure or the third data structure.

15. The method in accordance with claim 14, wherein the fourth data structure contains tuples of the multidimensional result set of an analytical engine of an online analytical processing system.

16. The method in accordance with claim 13, wherein the operations further comprise aggregating the data based on the main query.

17. The method in accordance with claim 13, wherein the operations further comprise, if the one or more conditions are on non-hierarchical characteristics, running a prequery processing to build a multidimensional tuple filter.

* * * * *